March 3, 1959 L. E. WOLINSKI 2,876,186
TREATMENT OF POLYESTER STRUCTURE
Filed Sept. 6, 1956
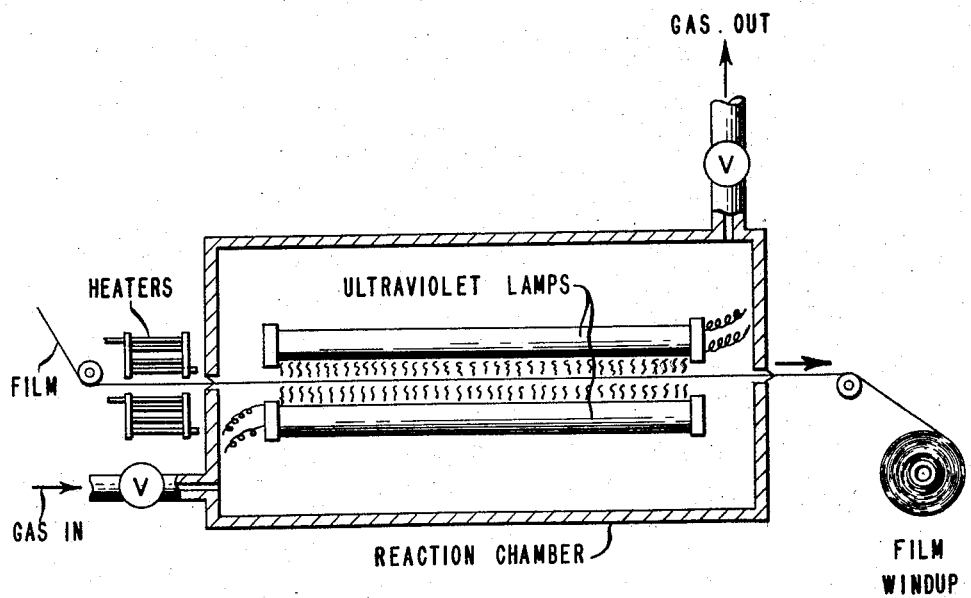
INVENTOR
LEON E. WOLINSKI
BY
ATTORNEY

United States Patent Office 2,876,186
Patented Mar. 3, 1959

2,876,186

TREATMENT OF POLYESTER STRUCTURE

Leon E. Wolinski, Buffalo, N. Y., assignor to E. I. du Pont de Nemours and Company, Wilmington, Del., a corporation of Delaware Application September 6, 1956, Serial No. 608,325

4 Claims. (Cl. 204—158)

This invention relates to improvements in synthetic linear polyester structures and, more particularly, to an improved method for enhancing the heat-seal characteristics of oriented film of polyethylene terephthalate and like synthetic linear polymers.

Films of polyethylene terephthalate and like linear polyesters which have been biaxially-oriented, i. e., stretched and/or rolled in two directions, find use in a great variety of applications, e. g., packaging, electrical applications, as a dielectric, protective coverings, glass replacements, etc. Heretofore, use of such films has been greatly restricted in applications requiring heat-sealing or lamination of the film because of the unsatisfactory heat-seal characteristics thereof. When it is attempted to heat-seal or bond together through the agency of heat, an oriented polyethylene terephthalate film, the film shrinks or retracts in the heated area and the heat-seal is usually puckered, and may also be brittle and/or opaque, and the film is liable to tear at the seam as it shrinks. Furthermore, it is necessary to employ, even to effect an unsatisfactory seal between layers of oriented film, temperatures far above normal heat-sealing temperatures employed in sealing unoriented thermoplastic films. For example, whereas unstretched polyethylene terephthalate film is heat-sealable at temperatures from 150° C.–170° C., it is necessary to employ heat-sealing temperatures within the range of from 235° C.–245° C. to seal oriented polyethylene terephthalate film which has been stretched three times (3×) in both directions and heat-set (i. e., subjected to heat at from 150° C.–200° C. while under tension).

It is an object of this invention to provide a method for materially improving the adhesion, and particularly the heat-seal characteristics of synthetic linear polyester structures, e. g., films. A further object is to provide an improved biaxially-oriented polyethylene terephthalate film which may be satisfactorily heat-sealed at moderate temperatures (190° C. or less) to form attractive, strong and water-insensitive seals. These and other objects will more clearly appear hereinafter.

By "water-insensitive seals" is meant that the seals retain approximately the original seal strength after 60 hours' immersion in water at about 25° C.

The foregoing objects are realized by the present invention which, briefly stated, comprises subjecting the surface of synthetic linear polyester structures, e. g., oriented polyethylene terephthalate film to the action of a gaseous atmosphere containing as the sole reactive ingredients chlorine gas and ozone, the ratio of the volume of chlorine to the volume of ozone in said atmosphere being within the range of from 0.625/1 to 150/1, said atmosphere containing from 5% to 75% of chlorine based on the total volume of said atmosphere, the action being carried out in the presence of ultra-violet light having wave-lengths of 2500 to 3200 A. at a temperature within the range of from 25° C.–150° C. for a period of time sufficient to render the film heat-sealable at a heat-seal temperature of about 190° C. to form water-insensitive seals.

The preferred subject for treatment in accordance with the process of this invention is biaxially-oriented, balanced, heat-set polyethylene terephthalate (i. e., polyethylene terephthalate film), which has been drawn to the same extent both in the longitudinal (machine) direction and transverse direction of the film and thereafter heat-set by known expedients. It is to be understood, however, that the present invention comprehends oriented films of any synthetic linear polyester prepared by reacting terephthalic acid, dialkyl terephthalates, or ester-forming derivatives thereof with a glycol of the series $HO(CH_2)_nOH$, where $n$ is a whole number within the range of 2–10. They may also include up to 20% by weight of a second acid or ester thereof, said second acid being selected from the group consisting of isophthalic acid, dibenzoic acid, hexahydro-terephthalic acid, adipic acid, sebacic acid, azaelic acid, naphthalic acid, 2,5-dimethyl terephthalic acid and bis-p-carboxyphenoxy ethane.

An essential feature of the present process is that the treatment with the chlorine-ozone-oxygen atmosphere be carried out while exposing the polyester structure to ultra-violet light having wave-lengths within the range of from 2500 to 3200 A. I have discovered that ultra-violet light within this range greatly accelerates the reaction of the gases. For example, the time required to render oriented polyethylene terephthalate film heat-sealable (at 190° C.) by the action of a mixture of chlorine, ozone and oxygen gases in the presence of ultra-violet light having wave-lengths within the range of 3200–3900 A. is 25 minutes at room temperature, whereas, if the same film is subjected to the same atmosphere in the presence of ultra-violet light having wave-lengths within the range of 2500 to 3200 A., the treatment time is reduced to 60 seconds or less at room temperature. The use of ultra-violet light of wave-lengths below the herein-specified range may result in serious degradation of the film.

The time required to effect a substantial improvement in the heat-seal characteristics and to produce a film which will yield water-insensitive heat-seals in accordance with the process of this invention is as low as 30 seconds when the temperature of treatment is 150° C., or as low as 1 minute at room temperature (25° C.). On the other hand, the treatment may be continued for as long as 2 minutes at 150° C. or 5 minutes at 25° C. without degradation of the film.

The preferred arrangement of apparatus for carrying out the process of this invention is illustrated diagrammatically in the accompanying drawing. Referring to the drawing, continuous film from any desirable source, e. g., film fed directly from the film stretching apparatus, or from a mill roll is passed between a bank of ultra-violet lamps mounted in a closed chamber. A mixture of cholorine gas and ozone in oxygen is introduced into the chamber by suitable gas inlet means at one end of the chamber and is exhausted at the opposite end. If desired, the film may be preheated in a heating zone just prior to the entry of the film into the chamber. The treated film is continuously collected on a conventional film windup roll. The linear speed of the film through the closed chamber will, of course, be adjusted in accordance with the predetermined temperature of treatment within the ranges above-specified. The time required will, of course, decrease as the temperature of treatment is increased.

In the examples to be described hereinafter, amorphous polyethylene terephthalate film (prepared in accordance with the general procedure described in United States Patent 2,465,314, issued to Whinfield and Dickson) was extruded at a temperature of 300° C. through a narrow orifice of an extrusion hopper vertically downward onto a cool drum maintained at 65° C. After quenching, the film was stretched 3× in both directions in accordance with the method set forth in copending application of A. C. Scarlett, United States Serial No. 287,354, filed May 12, 1952, and heat-set while held under tension at 150° C. The film had a final thickness of 0.5 mil. After heat-setting, the film was ready to be subjected to the treatment which will be described in the following examples of specific embodiments which will serve to illustrate the principles and practice of the present invention.

EXAMPLE 1

Samples of 0.5 mil polyethylene terephthalate film, prepared as described above, were placed on a chrome ferrotype plate. This plate was then placed under the lamps in a reaction chamber containing two General Electric A–H₄ mercury arc lamps with the glass shields removed, a thermometer, and an inlet and an outlet for the reaction gases. The General Electric A–H₄ mercury lamps with the outer glass units removed were found to have the following active wave-lengths in Angstrom units: 2535, 2649, 2801, 2872, 2964, 3019, 3124, 3340, 3645 and above. Lamps with the glass shields intact were found to cut off all wave-lengths below 2964 Angstrom units.

Prior to the insertion of the film samples, the chamber was flushed with a mixture of ozone and chlorine gases for 10 minutes. The ozone (3.34% ozone in oxygen), delivered by a Wellsbach ozone generator, was delivered at a rate of 0.146 cubic foot/min. Chlorine (100%) was simultaneously passed through the chamber at a rate of 0.017 cubic foot/min. The non-preheated film samples (one surface) were then subjected to the action of the gaseous mixture for varying reaction times. The film was then tested for heat-sealability, and water-sensitivity. Heat-seal strength is a measure of the strength of the bond between two films when they are sealed together by heat and pressure. For purposes of comparison and definition, the following test is used to measure the strength of the heat-seal bond.

A piece of film 4″ x 10″, with the grain (machine direction) running in the long direction, is cut into two pieces, 4″ x 5″, handling all pieces by the corner so as not to contact the areas to be sealed. The two pieces 4″ x 5″ are superimposed on the others so that the opposite (chlorinated) surfaces are in contact. The two pieces of superimposed film are then sealed together at each end, at right angles to the grain with a sealing bar. The sealing bar was 0.75″ wide, and the film was heated to 190° C. with 20 lbs./sq. inch pressure, and a contact time of 2 seconds. The sealed sheets are then cut in half at right angles to the grain, and each half is cut into 1.5″ wide strips, parallel to the grain, from the center of the sheet, resulting in four sets to be tested. Each of the 1.5″ wide seal strips is opened at the free ends, placed in a Suter testing machine and pulled apart. The force in grams required to pull the strips apart is taken as a measure of the heat-seal bond strength.

The sensitivity of the treated heat-sealed film samples to water was tested by immersing the film samples in water kept at room temperature. After 60 hours, the film was removed from the water and the seal tested in a Suter tester.

Table I, below, lists the effect of varying reaction times on the heat-sealability and water-sensitivity of these film samples. Listed are the approximate reaction time in seconds, the initial film temperature, the reaction chamber temperature, the average heat-seal in grams, and the sensitivity of the seals after 60 hours.

Table I

| Reaction Time (Minutes) | Initial Film Temperature, °C. | Chamber Temperature, °C. | Heat-Seal, g./inch | Water-Sensitivity |
|---|---|---|---|---|
| 0.25 | 27 | 56 | 785 | Sensitive. |
| 0.50 | 27 | 56 | 281 | Do. |
| 1.00 | 27 | 57 | 353 | Insensitive. |
| 2.00 | 27 | 59 | 385 | Do. |
| Control [1] | 28 | 59 | 0 | |

[1] Lamps shielded with window glass which filters out ultra-violet light below 3200 Angstrom units. Reaction time: 5 minutes.

Table I reveals that film samples subjected to the ozone-oxygen-chlorine mixture at room temperature require reaction times of from 1–2 minutes to produce satisfactory heat-sealable and water-insensitive film. A reaction time of 1.5 seconds produced high heat-seal values, but the films were sensitive to water.

EXAMPLE 2

Samples of 0.5 mil polyethylene terephthalate film, prepared as described above, were preheated to 150° C. and thereafter treated in a similar manner to that described in Example 1. Table II lists the approximate reaction time in seconds, the initial film temperature, the reaction chamber temperature, the average heat-seals in grams, and the sensitivity of the seals to water after 60 hours.

Table II

| Reaction Time (Minutes) | Initial Film Temperature, °C. | Chamber Temperature, °C. | Heat-Seal, g./inch | Water-Sensitivity |
|---|---|---|---|---|
| 0.25 | 150 | 62 | 283 | Sensitive. |
| 0.50 | 150 | 62 | 350 | Insensitive. |
| 1.00 | 150 | 62 | 400 | Do. |
| 2.00 | 150 | 63 | 165 | Do. |
| Control [1] | 150 | 62 | 0 | |

[1] Lamps shielded with window glass which filters out ultra-violet light below 3200 A. Reaction time 5 minutes.

With samples preheated to 150° C., it was found that water-insensitive, strong heat-seals could be obtained with exposures to ozone-chlorine mixture as low as 30 seconds. The preferred range lies between 30 seconds and 1 minute. Exposures to the ozone-oxygen-chlorine mixture in excess of 2 minutes tend to lower the heat-seal strength.

Although in the embodiments of the invention described hereinbefore, the film has been stretched in 2 directions and heat-set prior to undergoing halogenation, it is to be understood that the film may be subjected to the action of the gas mixture at any time after being extruded.

While the method of the present invention is particularly suitable for use in connection with synthetic polyester films, such as polyethylene terephthalate film, it can be applied with advantage to other structures, as well, such as fibers, filaments, tubes, rods, and the like; the surfaces of which are desired to be modified so that they can be satisfactorily subjected to sealing operations. Although particular emphasis, heretofore, has been placed on the preparation of films for heat-sealing operations, it is to be understood that the process of the invention is no less successful in producing films which are readily sealed by other means such as solvent adhesives, cements and glues. Films produced by the present process are also highly receptive because of their improved adhesion to coating operations wherein coatings designed to improve such properties as the moistureproofness, resistance to corona discharge, etc., are applied to the film.

The process, as set forth hereinbefore, presents a quick, efficient route for imparting highly satisfactory adhesive properties to synthetic linear polyester film structures. The present method radically speeds up the rate of reaction of the gaseous mixture on the surface of the linear polyester structure. The catalysis of the reaction characteristic of the process of the present invention with ultraviolet light rays having Angstrom units within the range of 2500–3200 A. presents a novel, yet remarkably practical, method of obtaining good adhesion, e. g., heat-sealability, dye-receptivity, in linear polyester structures without sacrificing the inherent desired physical characteristics of these structures.

The advantages of readily dyeable polymers of ethylene terephthalate and related polymers to manufacturers of apparel and other textiles is readily apparent, as is the utility of adhesiveness and printability of films so comprised to makers and users of packaging and similar materials. Polyethylene terephthalate fabrics treated with ozone or manufactured from staple fibers, so treated, have an added desirable characteristic of increased resistance to "piling," i. e., tendency toward the accumulation of numerous unsightly small balls of yarn on the surface of the fabric. Other benefits of the practice of the present invention will come readily to mind.

The availability of sealable, oriented, polyethylene terephthalate films opens many new uses for such films heretofore not useful because of the non-adherability of these types of films. Such markets as the pre-packaging of meats, frozen food packaging, bags, etc. will now be open to the use of the subject films and the like, prepared by the process of the present invention.

I claim:

1. The process of treating film of synthetic linear polyesters of a glycol of the series $HO(CH_2)_nOH$ wherein $n$ is a whole number within the range of 2–10 inclusive and acids selected from the group consisting of (1) terephthalic acid and (2) a mixture of terephthalic acid with up to 20% by weight, based on the total weight of acids, of a second acid selected from the group consisting of isophthalic acid, dibenzoic acid, hexahydroterephthalic acid, adipic acid, sebacic acid, azaelic acid, naphthalic acid, 2,5-dimethyl terephthalic acid and bis-p-carboxyphenoxy ethane, which comprises subjecting the surface of said film to the action of a gaseous atmosphere containing as the sole reactive ingredients chlorine gas and ozone, the ratio of the volume of chlorine to the volume of ozone in said atmosphere being within the range of from 0.625/1 to 150/1, said atmosphere containing from 5% to 75% of chlorine based on the total volume of said atmosphere, the action being carried out in the presence of ultra-violet light having wave-lengths of 2500–3200 A. at a temperature within the range of from 25° C. to 150° C. for a period of time sufficient to render the film heat-sealable at a heat-seal temperature of about 190° C. to form water-insensitive seals.

2. The process of claim 1 wherein the polyester is polyethylene terephthalate.

3. The process of claim 2 wherein the film is oriented polyethylene terephthalate film.

4. The process of claim 3 wherein the film is biaxially-oriented polyethylene terephthalate film.

References Cited in the file of this patent

UNITED STATES PATENTS 2,715,075     Wolinski _____ Aug. 9, 1955